US007290775B2

(12) United States Patent
Parker et al.

(10) Patent No.: US 7,290,775 B2
(45) Date of Patent: Nov. 6, 2007

(54) STACKABLE REFUSE CART

(75) Inventors: Brian G. Parker, Alto, MI (US); Mariano D. Acosta, Caledonia, MI (US); James R. Kilduff, Sidney, MI (US); Joseph A. Bollo, Jr., Hudsonville, MI (US)

(73) Assignee: Cascade Engineering, Inc., Grand Rapids, MI (US)

(*) Notice: Subject to any disclaimer, the term of this patent is extended or adjusted under 35 U.S.C. 154(b) by 188 days.

(21) Appl. No.: 11/105,633

(22) Filed: Apr. 14, 2005

(65) Prior Publication Data

US 2006/0232029 A1 Oct. 19, 2006

(51) Int. Cl.
*B62B 1/00* (2006.01)
*B62D 39/00* (2006.01)
*B65D 21/00* (2006.01)

(52) U.S. Cl. .............................. 280/47.26; 280/47.24; 280/33.998; 206/515; 206/516; 206/517; 206/518; 206/519; 206/520

(58) Field of Classification Search ............ 280/47.26, 280/33.998, 47.24; 206/515–520
See application file for complete search history.

(56) References Cited

U.S. PATENT DOCUMENTS 3,346,271 A * 10/1967 Parsons ................ 280/33.998
4,111,303 A * 9/1978 Compton .................... 206/520
5,465,844 A * 11/1995 Lee ............................ 206/515
5,692,761 A * 12/1997 Havlovitz ............. 280/33.994
5,743,542 A * 4/1998 Mast et al. ............. 280/47.26
2001/0045371 A1* 11/2001 Ordonez ..................... 206/499
2003/0213808 A1* 11/2003 Berger ........................ 220/832
2004/0108666 A1* 6/2004 Lauer .................... 280/33.998

* cited by examiner

*Primary Examiner*—Christopher P. Ellis
*Assistant Examiner*—John R. Olszewski
(74) *Attorney, Agent, or Firm*—Warner Norcross & Judd LLP

(57) ABSTRACT

A stackable refuse cart includes a container, an axle, a set of wheels. The container includes first and second axle supports. The first axle support supports the axle in an operative position to rotatably support the container. The second axle support supports the axle in a stowage position enabling the container to be stacked with other containers without interference from the axles. In one embodiment, the second axle support includes a recess defined in the floor of the container. In another embodiment, the second axle support includes a pair of supports that hold the axle against a sidewall within the container. In yet another embodiment, the second axle support is a cradle integral with the container handle.

21 Claims, 13 Drawing Sheets

STACKABLE REFUSE CART

BACKGROUND OF THE INVENTION

The present invention relates to refuse carts, and more particularly to refuse carts that may be stacked together for shipment.

Refuse carts are common in commercial and residential settings for transporting waste. Common refuse carts include a container for holding refuse, and a pair of wheels and an axle for rolling the cart. The container is usually comprised of molded plastic, and includes sidewalls and a floor that define a space for containing refuse. The axle is supported on the container, and the wheels are supported on the axle. A handle may be included for pushing or pulling the cart on the wheels.

In order to take full advantage of shipping space, manufacturers of refuse carts generally stack a number of carts together for shipping. Most commonly this is done by stacking carts together, one container inside another, with only the bottom cart assembled with wheels and an axle. This allows the containers to be stacked tightly together, and reduces the required shipping space per container. The wheels and axles for each remaining stacked cart are often stowed in the empty space between each nested container. More recently, however, manufacturers have increased the draft angle of the sidewalls in order to more densely stack the containers. In these cases, the axles do not fit in the space between stacked containers because they interfere with stacking. Consequently, the axles for all of the containers in a stack are often shipped together as a group. This presents a number of difficulties. First, it is possible to miscount the axles, and thereby ship too few axles for a stack, resulting in one or more useless containers without wheels. Second, some manufacturers provide a separate box or container for stowing the wheels and axles, but these separate containers create an extra cost and they partially defeat the space saving purpose of stacking the carts in the first place. Third, other manufacturers place the wheels and axles for all of the carts inside the top container. This method does not take up additional storage space, but is recognized as being undesirable because the weight in the top container makes the stack top heavy and more difficult to handle.

SUMMARY OF THE INVENTION

The aforementioned problems are overcome by the present invention wherein a refuse cart is provided with an integral axle stowage support. The axle stowage support positions, holds, or retains the axle in a stowage position separate from the assembled position and in a location that does not interfere with stacking. The axle stowage support enables an axle and a set of wheels to be stowed in each container while still allowing the containers to be stacked tightly together.

In one embodiment, the axle stowage support is a recess that is defined in the floor and/or sidewall of the container. The recess is shaped to receive at least a portion of the axle, so the axle can be placed in the container without interfering with another stacked container. The support may additionally include a pair of ribs that extend from the floor of the container and are spaced to fit on opposite sides of the axle.

In another embodiment, the axle stowage support includes one or more ribs on the inner surface of the container. The ribs may extend from one or more sidewalls to support the axle. The ribs may be the front sidewall of the container near the top of the container where the container is wide enough to receive the axle in a horizontal position.

In another embodiment, the axle stowage support is an axle holder on the exterior of the container. The axle holder may include a cradle that is integral with the rim or handle of the cart. In addition, the handle on each cart may include a hold-down, positioned so that when a first container is stacked inside a second container, an axle is held between the cradle in the handle of the second container and the hold-down in the handle of the first container.

The present invention provides a place for stowing axles during transportation of a dense stack of refuse carts. The axle stowage support allows the axle of each cart to be stowed with its respective container, so the manufacturer can take full advantage of shipping space without the cost of an additional container for the axles and wheels and without the concerns of placing all of the wheels and axles in the top container.

These and other objects, advantages, and features of the invention will be more fully understood and appreciated by reference to the detailed description of the current embodiments and the drawings.

DETAILED DESCRIPTION OF THE CURRENT EMBODIMENTS

Figure 1:
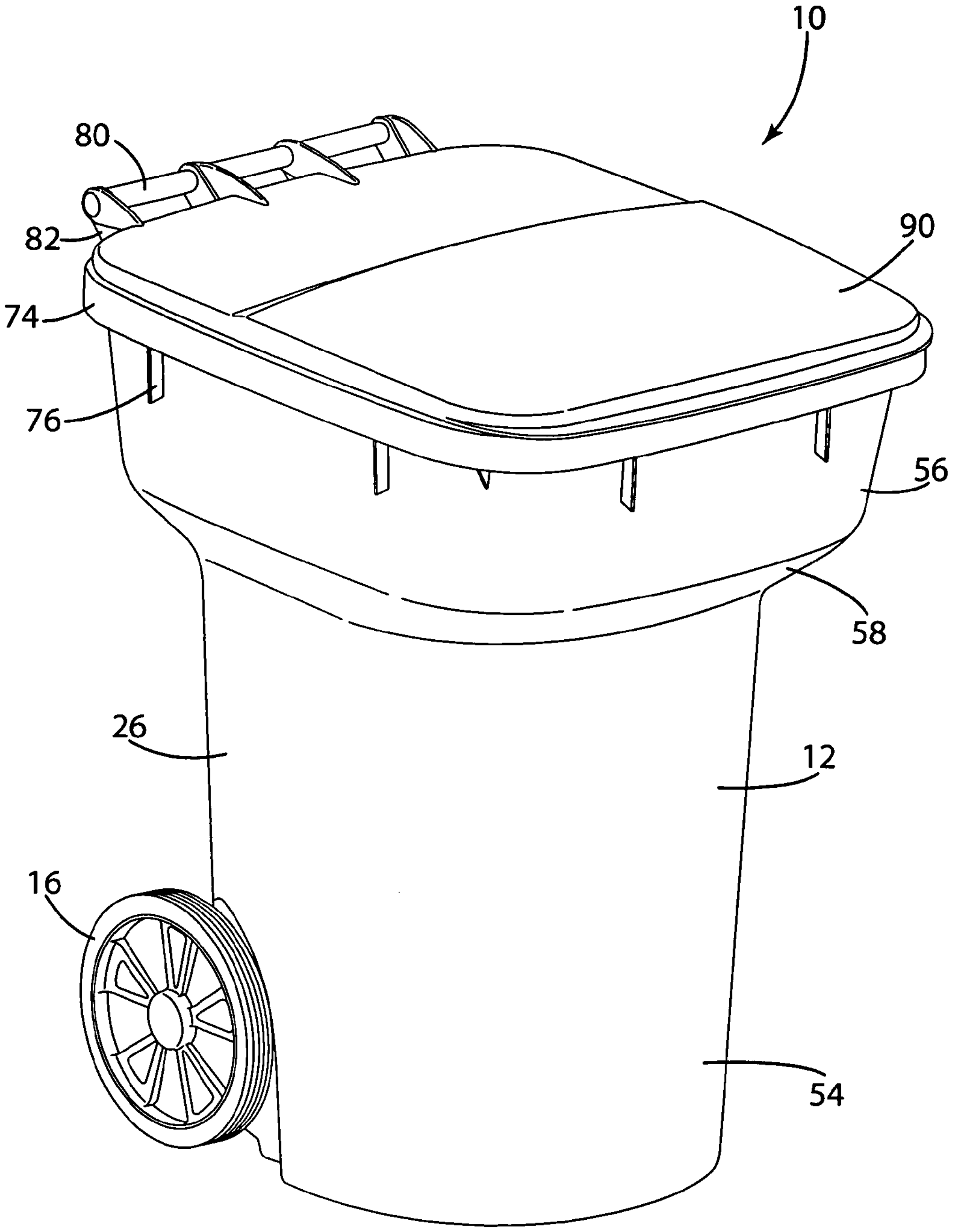
FIG. 1 is a perspective view of a refuse cart in accordance with the present invention.

A refuse cart in accordance with the present invention is shown in FIG. 1 and generally designated 10. In general, the refuse cart 10 includes a container 12, an axle 14, and a pair of wheels 16. The container 12 defines a space for containing refuse, and includes first and second axle supports 20 and 22. The first axle support 20 receives the axle 14 in a assembled position, wherein the wheels 16 can be attached to the axle 14, forming an assembled refuse cart 10 that may be transported using the wheels 16. The second axle support 22 receives the axle 14 in a stowage position, wherein the axle 14 may be stowed such that a plurality of carts 10 may be stacked together in an unassembled form (i.e. the wheels and axle are not attached) for shipment. In operation, after a container 12 is formed, an axle 14 is disposed in the second axle support 22, and a pair of wheels 16 are disposed inside the refuse containing space of the container 12. The container 12 is then stacked with a plurality of other containers 12, also including respective axles 14 and wheels 16, and the stack of unassembled carts 10 is shipped to a desired location. Upon arrival at the location, the carts 10 may be unstacked and the axles placed in the first axle support 20 wherein the wheels can be attached to form assembled carts.

Figure 2:
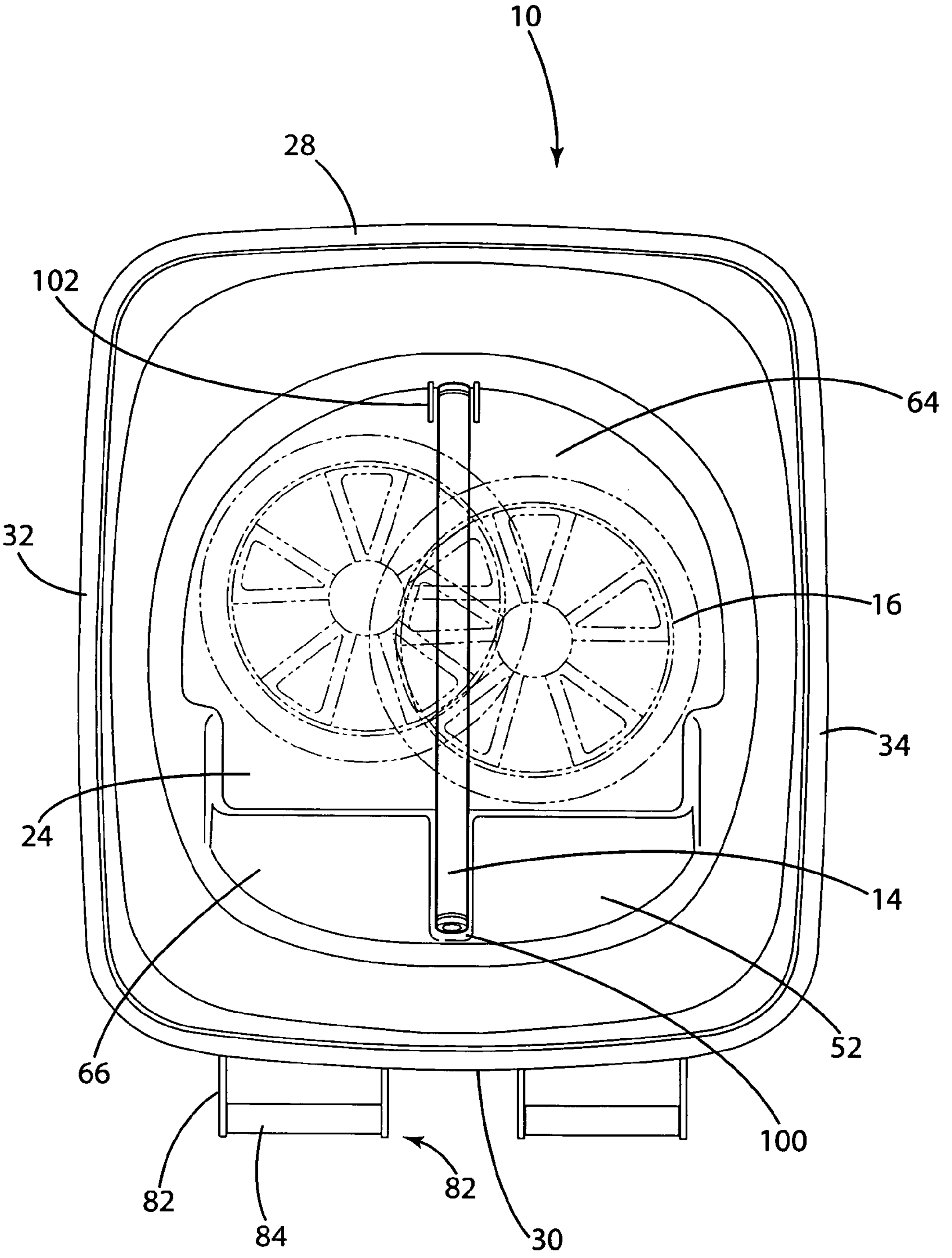
FIG. 2 is a top view of an unassembled refuse cart in accordance with one embodiment of the present invention.
Figure 3:
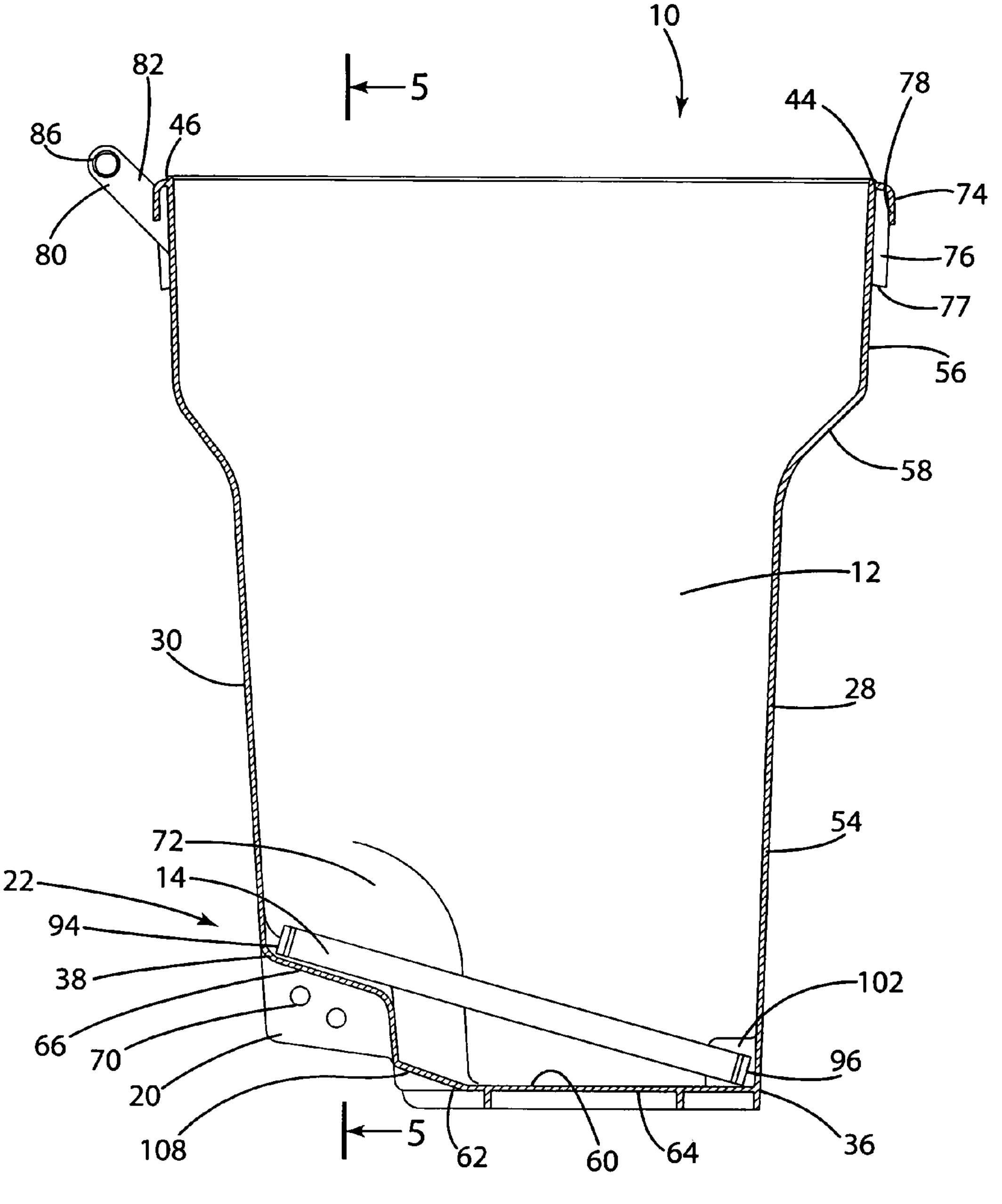
FIG. 3 is a side cross-sectional view of the container.

The container 12 is generally formed from plastic, such as by injection molding, but may be comprised of a variety of desired materials. The container 12 generally includes a floor 24 and a plurality of sidewalls 26. As shown in FIG. 2, the container 12 includes a front sidewall 28, a rear sidewall 30, and left and right sidewalls 32 and 34. The sidewalls 28, 30, 32 and 34 each include lower edges 36, 38, 40 and 42 that attach to the floor 24, and upper edges 44, 46, 48 and 50 that define an opening of the container 12. The sidewalls 26 and floor 24 combine to form a space 52 for containing refuse. As shown in FIG. 3, the sidewalls 26 may further include a lower portion 54 and an upper portion 56 that are joined by a transitional portion 58. The lower portion 54 extends upwardly from the floor 24, the transitional portion 58 flares outwardly from the lower portion 54, and the upper portion 56 extends upwardly from the transitional portion 58. The floor 24 includes an upper surface 60 attached to the sidewalls 26, and a lower surface 62. As shown in FIG. 3, the floor 24 may include a lower portion 64, and a raised portion 66. The raised portion 66 is raised from the lower portion 64 to accommodate the first axle support 20 which is disposed on the lower surface 62 of the raised portion 66. The first axle support 20 includes a plurality of ribs 68 that extend downwardly from the lower surface 62 of the raised portion 66 of the floor 24. Each rib 68 defines at least one axle 14 receiving hole 70. The holes 70 of each rib 68 are aligned so that they may slidably receive an axle 14. The left and right sidewalls 32 and 34 may each include a deformation 72 proximate the first axle support 20 that defines a space for the wheels 16 when they are assembled.

As shown in FIGS. 1-8, a rim 74 may extend from the upper edges 44, 46, 48 and 50 of the sidewalls 26. The rim 74 extends outwardly from the upper edges 44, 46, 48, 50 and then curves downward. The rim 74 may be formed integrally with the container 12, and may be supported by a plurality of stacking ribs 76 that extend from the sidewalls 26 and attach to an inside surface 78 of the rim 74. The stacking ribs 76 include a lower surface 77 for supporting the weight of the container 12 when it is stacked. One or more handles 80 may also extend from one or more of the sidewalls 26, for instance, the handles 80 may extend outwardly from the upper edge 46 of the rear sidewall 30. As illustrated, the container 12 includes a pair of handles 80 that each include a pair of handle supports 82, and a cross piece 84. The handle supports 82 are generally narrow ribs that extend outwardly from the rear sidewall 30 at spaced apart locations. Each pair of handle supports 82 is generally joined by a cross piece 84 by a conventional method, such as by extending the cross piece through holes 86 in the handle supports 82. The container 12 may additionally include a conventional cover 90 that hingedly attaches to the handles 80. The cover may be moveable from a closed position wherein it rests on the rim 74, to an open position where it is folded back against the rear sidewall 30.

The axle 14 is generally an elongated cylindrical rod. The axle 14 may be comprised of a variety of materials, such as steel or plastic. As illustrated, the axle includes a body 92 and first and second ends 94 and 96. In addition, the axle 14 may include grooves 98 near each of the ends 94 and 96 that extend around the circumference of the axle 14. The wheels 16 are generally conventional, and with therefore not be described in great detail. Suffice it to say that the wheels may be comprised of any desired material, and are designed to attach to the ends 94 and 96 of the axle 14.

Figure 4:
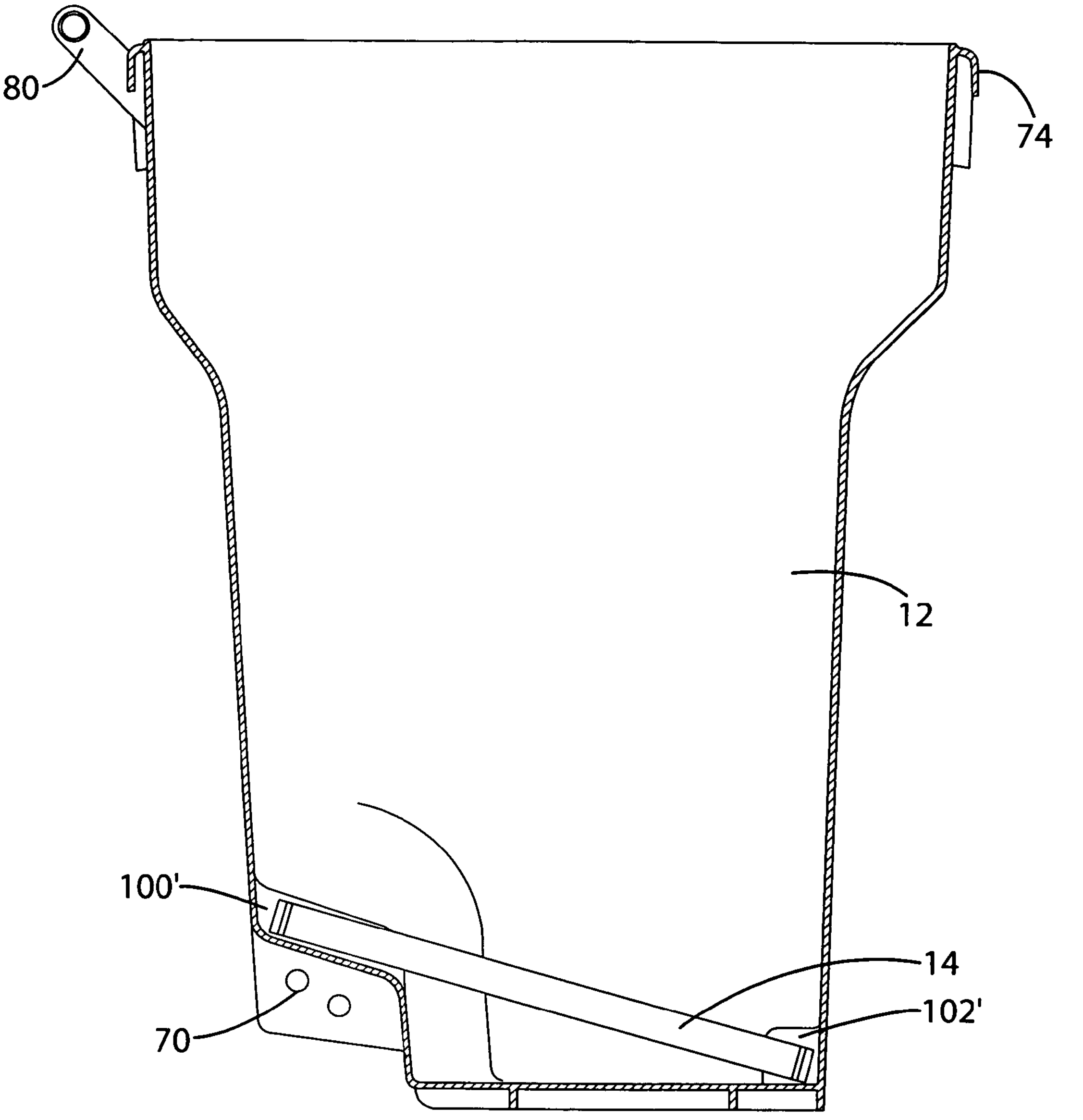
FIG. 4 is a side cross-sectional view of the container and axle in accordance with an alternative of the FIG. 3 embodiment.
Figure 5:
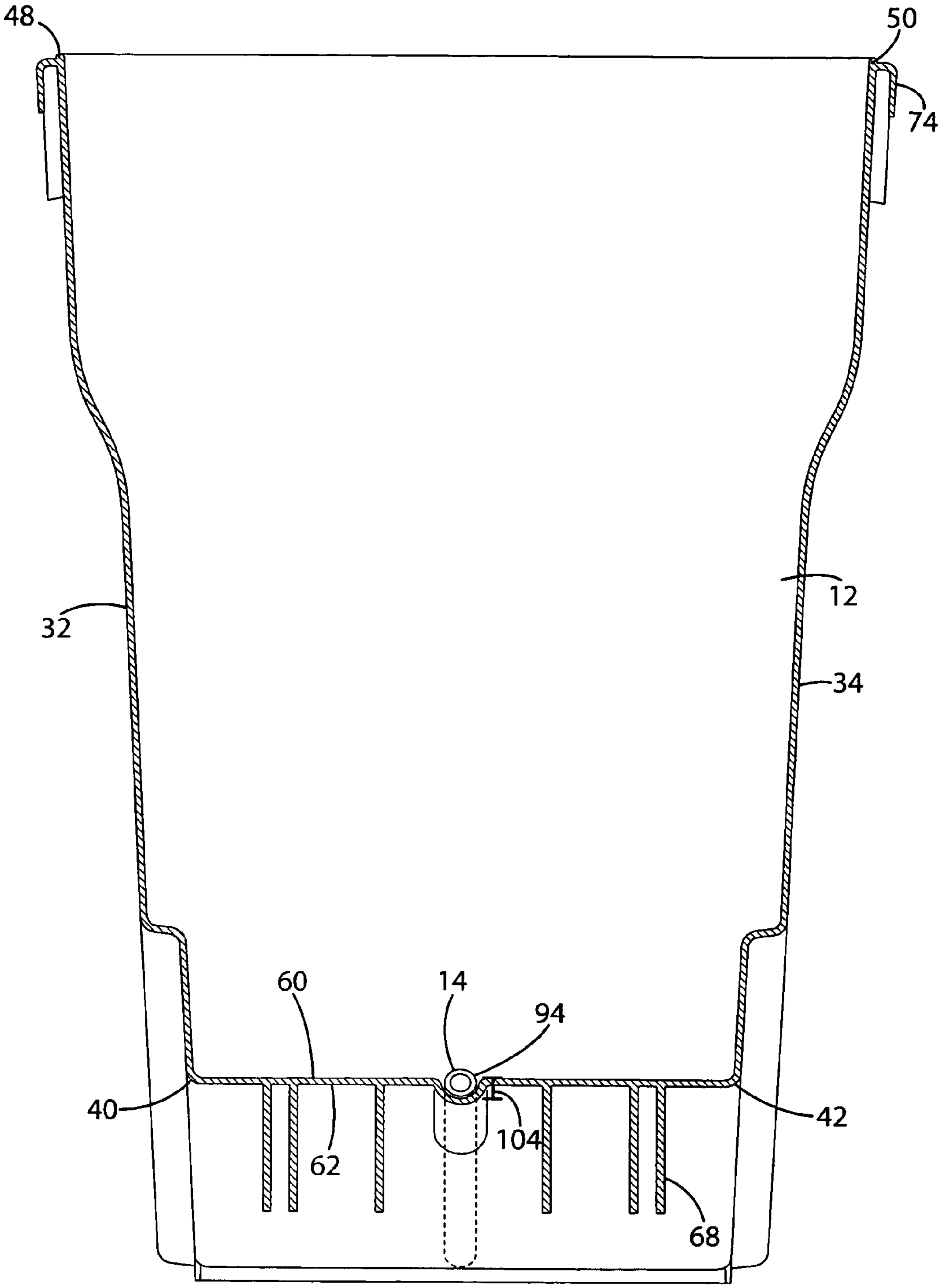
FIG. 5 is a rear cross-sectional view of the container and axle in accordance with the first embodiment.
Figure 6:
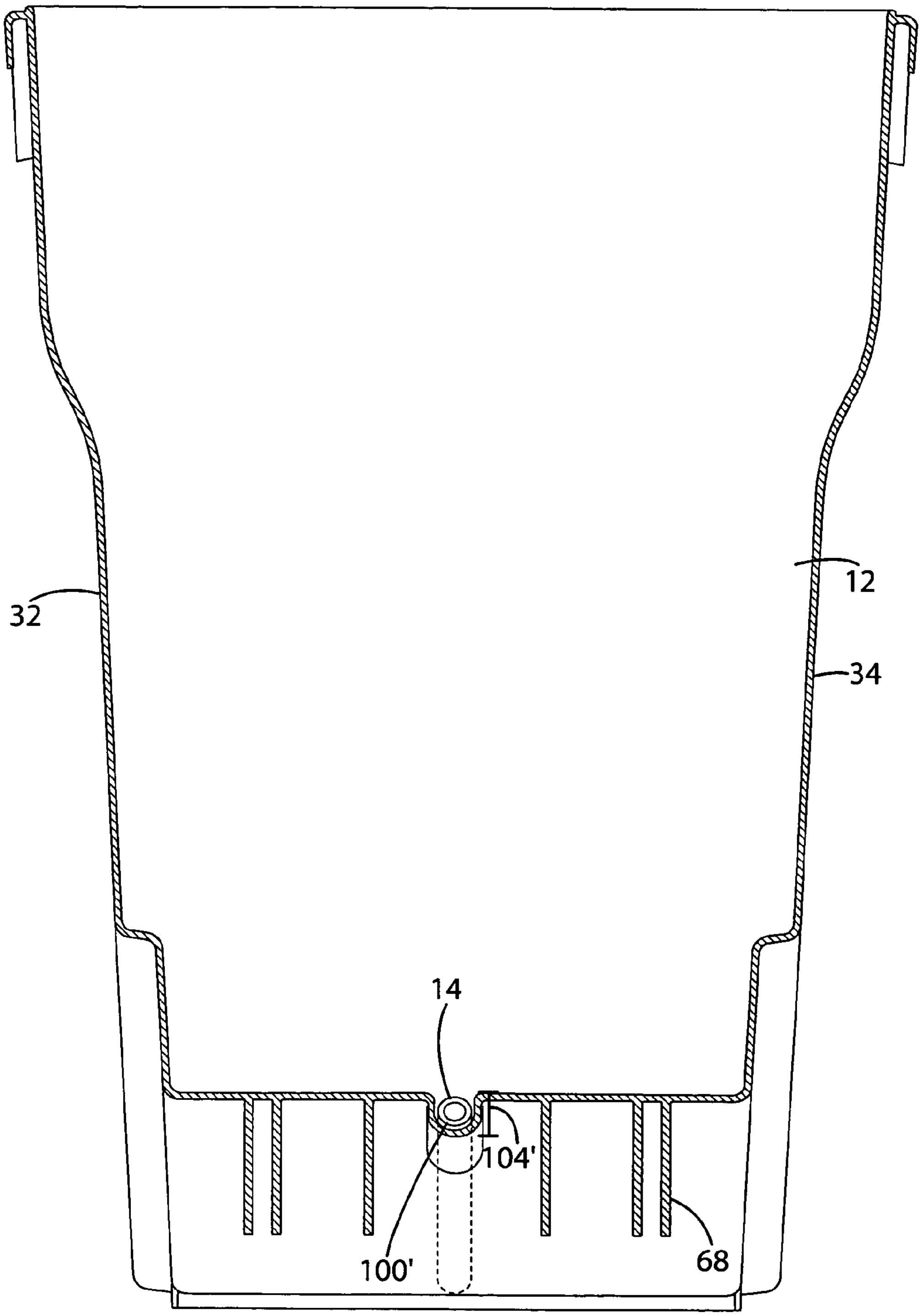
FIG. 6 is a rear cross-sectional view of the container and axle in accordance with an alternative of the FIG. 5 embodiment.
Figure 7:
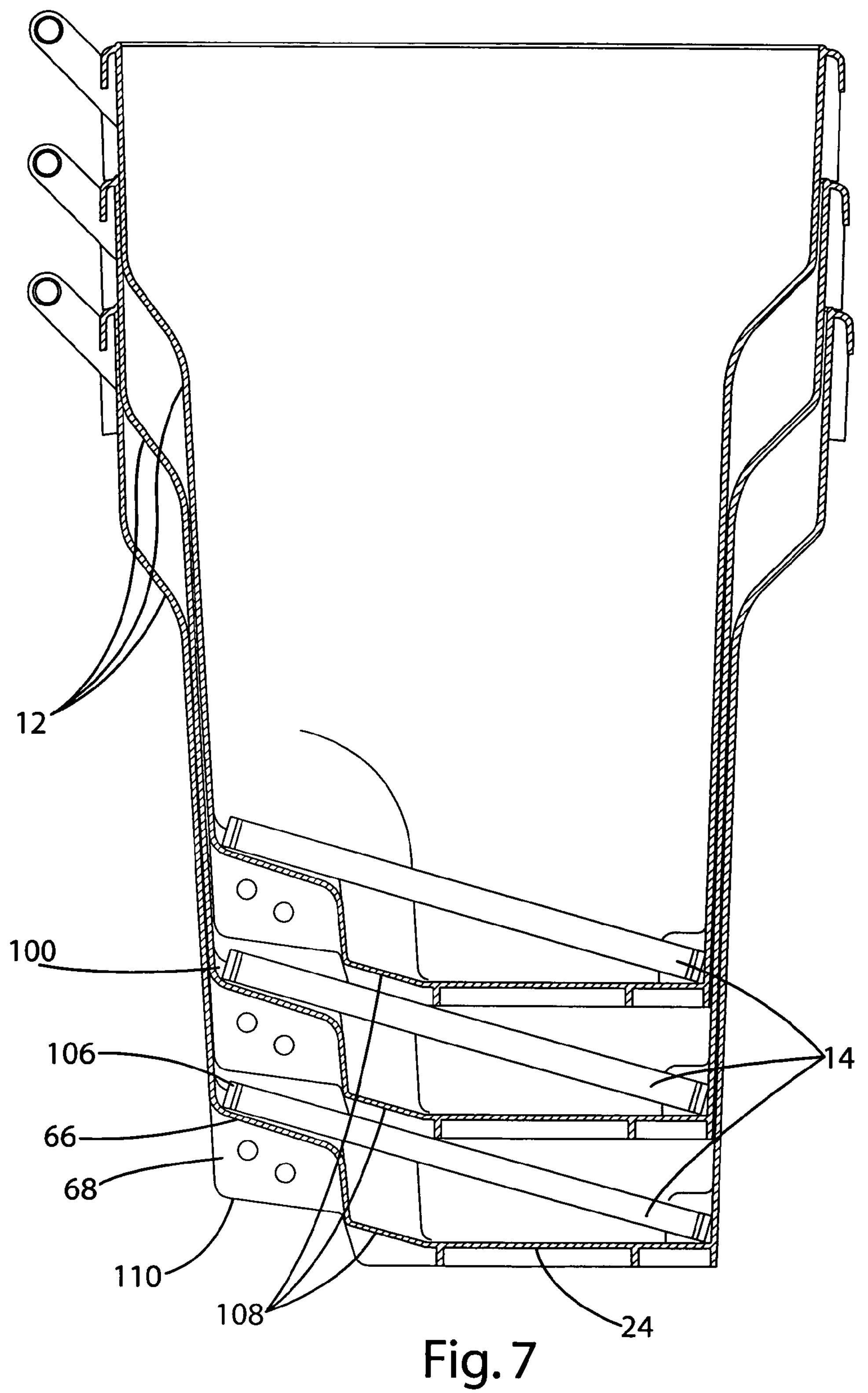
FIG. 7 is a side cross-sectional view of three stacked containers and axles.
Figure 8:
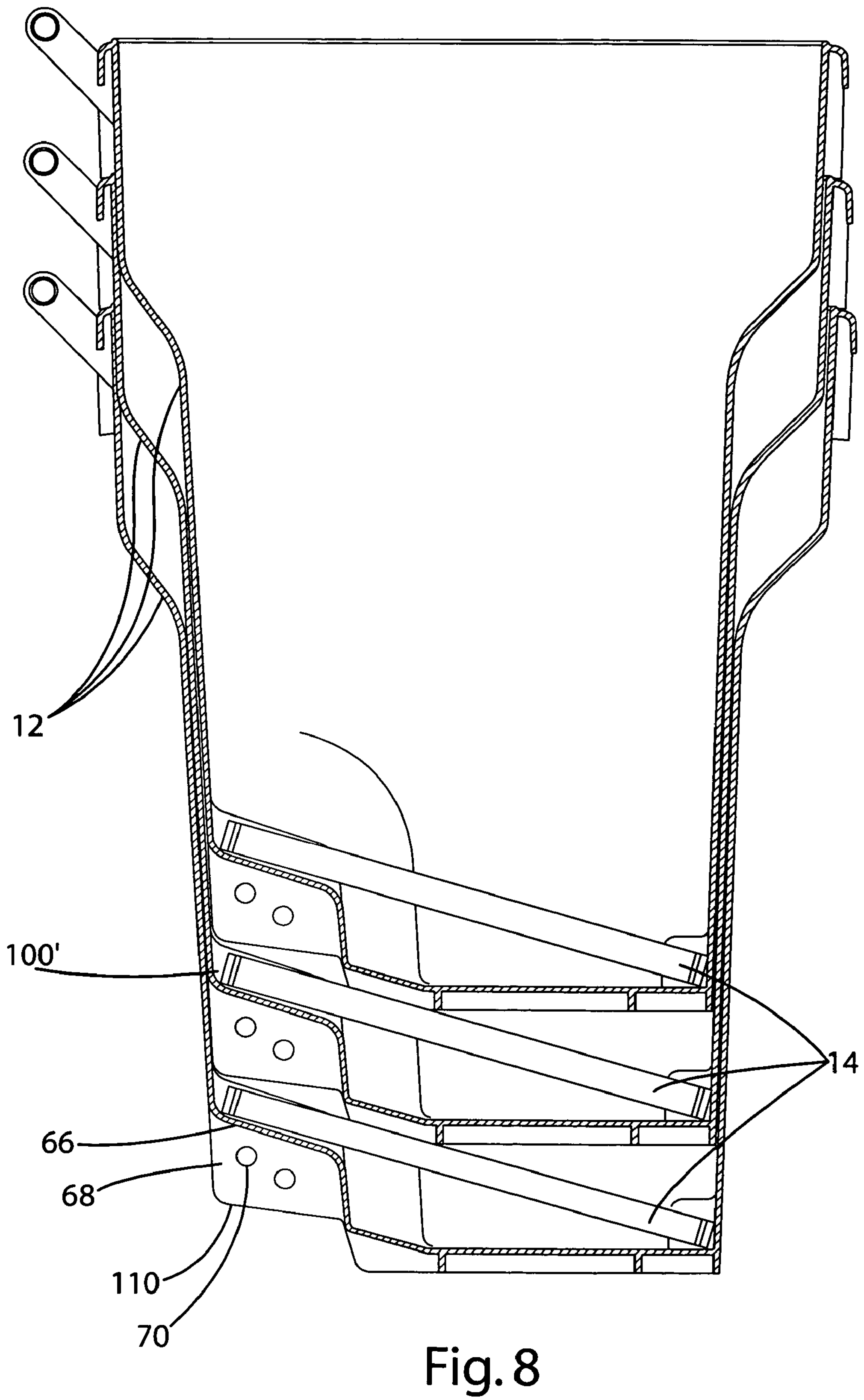
FIG. 8 is a side cross-sectional view of three stacked containers and axles in accordance with an alternative of the FIG. 7 embodiment.
Figure 9:
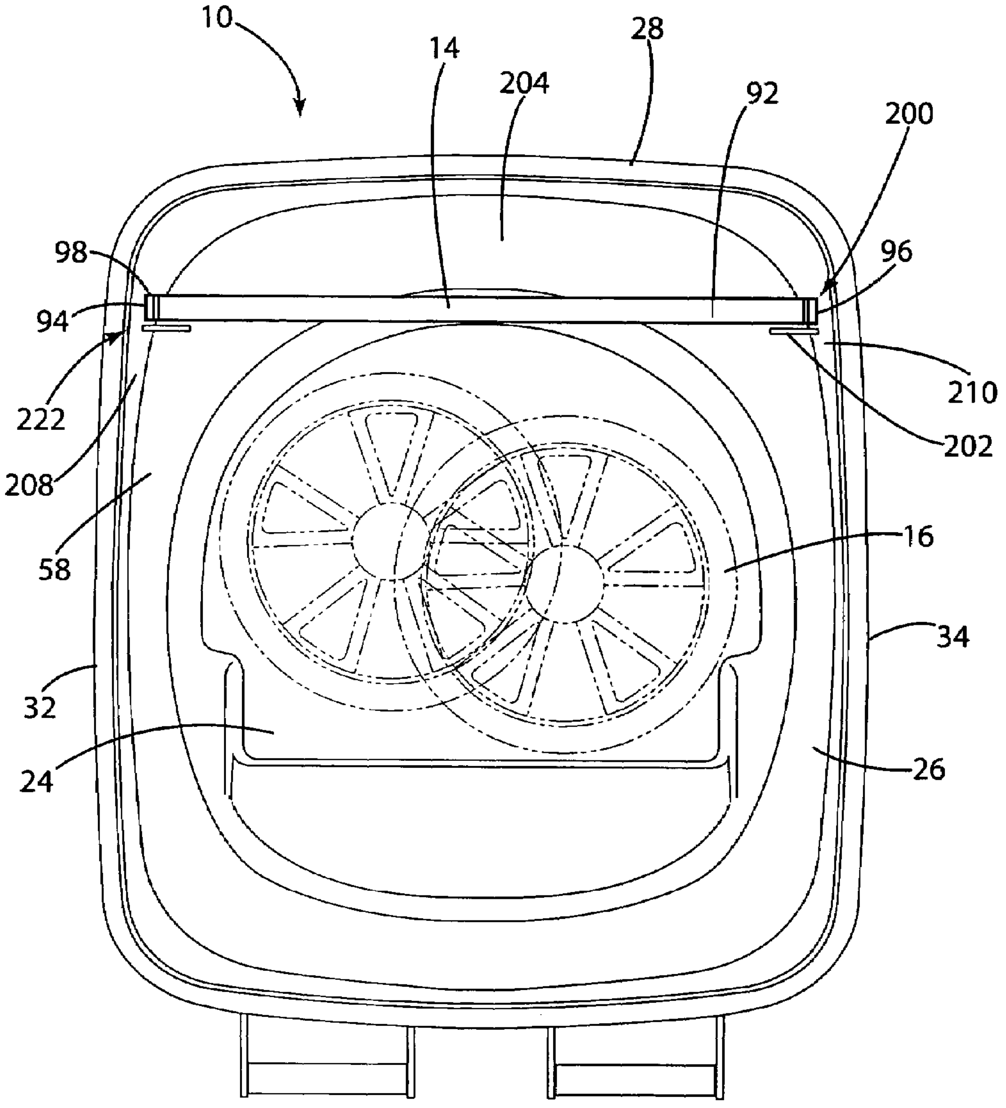
FIG. 9 is a top view of an unassembled refuse cart in accordance with a first alternative embodiment of the present invention.

The second axle support 22 is shaped to hold the axle 14 in a stowage position, and it may be attached to or integrally formed with the container 12. In the embodiment shown in FIGS. 2-8, the second axle support 22 includes a recess 100 defined in the floor 24 of the container 12. As illustrated, the recess 100 is located in the raised portion 66 of the floor 24 and is shaped to receive one of the ends 94 or 96 of the axle 14 and a portion of the axle body 92 so that one of the ends 94 or 96 of the axle may be disposed in the recess 100, and the other end 94 or 96 may extend across the floor 24 and rest on the lower portion 64 of the floor 24 near the front sidewall 28. The second axle support 22 may also include a pair of upstanding ribs 102 for holding the end 94 or 96 of the axle 14 opposite the end 94 or 96 disposed in the recess 100. As shown in FIGS. 2 and 3, the ribs may extend upwardly from the floor 24 and may be attached to the front sidewall 28. Alternatively, a second recess (not shown) may be defined in the floor 24 at the location of the ribs 102 to hold the end of the axle 14. Although not shown, the floor 24 on each side of the recess 100 may be angled slightly downward towards the recess 100 to direct an axle 14 into the recess 100. FIGS. 3, 5 and 7 illustrate one particular embodiment of the recess 100, wherein the recess defines a depth 104 that is less than the diameter of the axle 14. In this embodiment, when the axle 14 is disposed in the recess 100, a portion 106 of the axle 14 extends above the upper surface 60 of the floor 24. To accommodate for this portion 106 when the containers 12 are stacked together, the floor 24 may include an angled section 108 between the raised and lower portions 64 and 66 of the floor 24. As shown in FIG. 7, when the containers 12 and axles 14 of this embodiment are stacked together, the angled portion 108 provides space for the portion 106 so that the lower surface 110 of the first axle support ribs 68 may seat properly on the lower portion 66 of the floor 24. Another embodiment of the recess 100' is shown in FIGS. 4, 6 and 8. In this embodiment, the depth 104' of the recess 100' is greater than the diameter of the axle 14. Because of this added depth, the angled portion 108 is not necessary, because (as shown in FIG. 8) the containers can seat properly without it.

In operation, a container 12, an axle 14, and a pair of wheels 16 are gathered for a plurality of respective carts 10. For each cart 10, a pair of wheels 16 are placed in the bottom of the refuse containing space 52, such that they lie approximately flat on the floor 24. The axle 14 is then placed into the second axle support 22, such that a first end 94 or 96 is located in the recess 100, and a second end 94 or 96 is located between the ribs 102. A plurality of containers 12 are then stacked together for shipment. As mentioned previously, the containers generally stack inside of each other, such that the bottom surface 77 of the stacking ribs 76 of one container 12 rests on the rim 74 of the container 12 below it in the stack. The bottom surface 110 of the first axle support ribs 68 of one container 12 are therefore held just above the raised portion 66 of the floor 24 of another container 12. Because the axle 14 is placed in the second axle support 22, it does not interfere with the containers as they are stacked together. In one embodiment, the axle 14 of the bottom container 12 is inserted into the first axle support 20, and the wheels 16 attached to the axle 14 so that the bottom cart and all carts stacked above it may be rolled on the wheels 16 and easily transported, for instance, to a waiting truck. After the unassembled stacked carts 10 arrive at a desired location, they are unstacked and the wheels 16 and axles 14 removed from each respective container 12. The axles 14 may then be inserted into corresponding first axle supports 20, and the wheels 16 attached to the axles 14, forming a plurality of assembled carts 10.

First Alternative Embodiment

Figure 10:
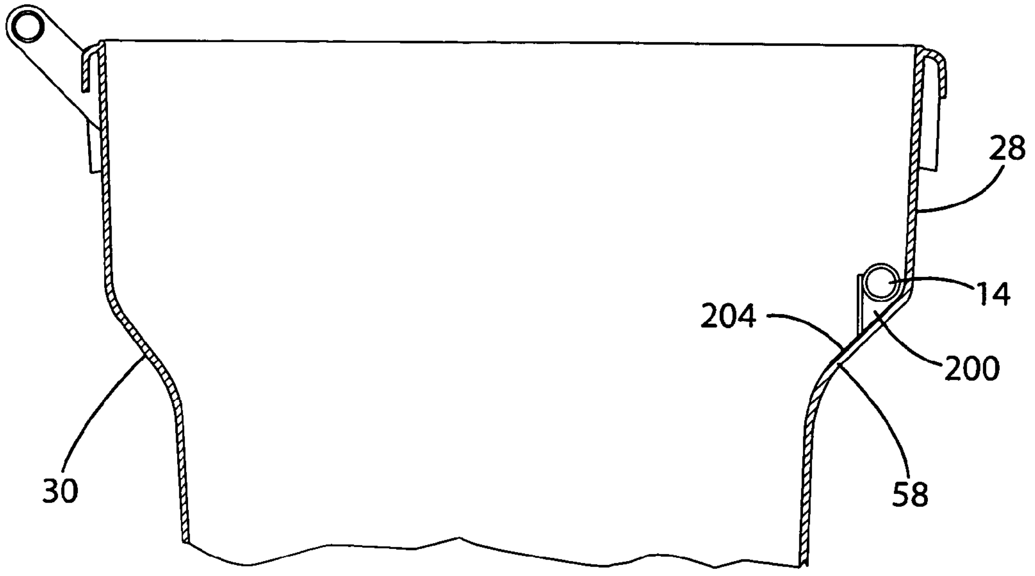
FIG. 10 is a side cross-sectional view of the container and axle in accordance with the first alternative embodiment.
Figure 11:
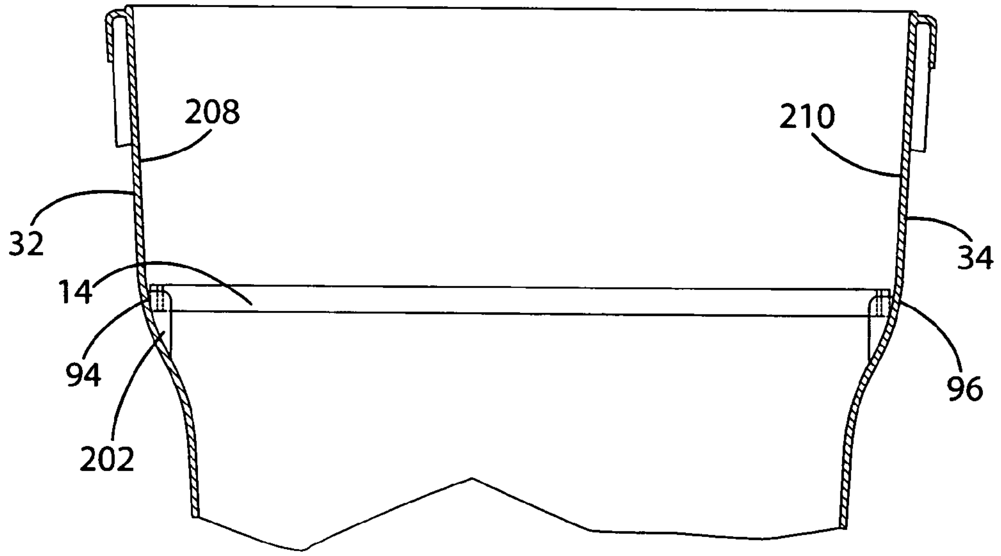
FIG. 11 is a rear cross-sectional view of the container and axle in accordance with the first alternative embodiment.
Figure 12:
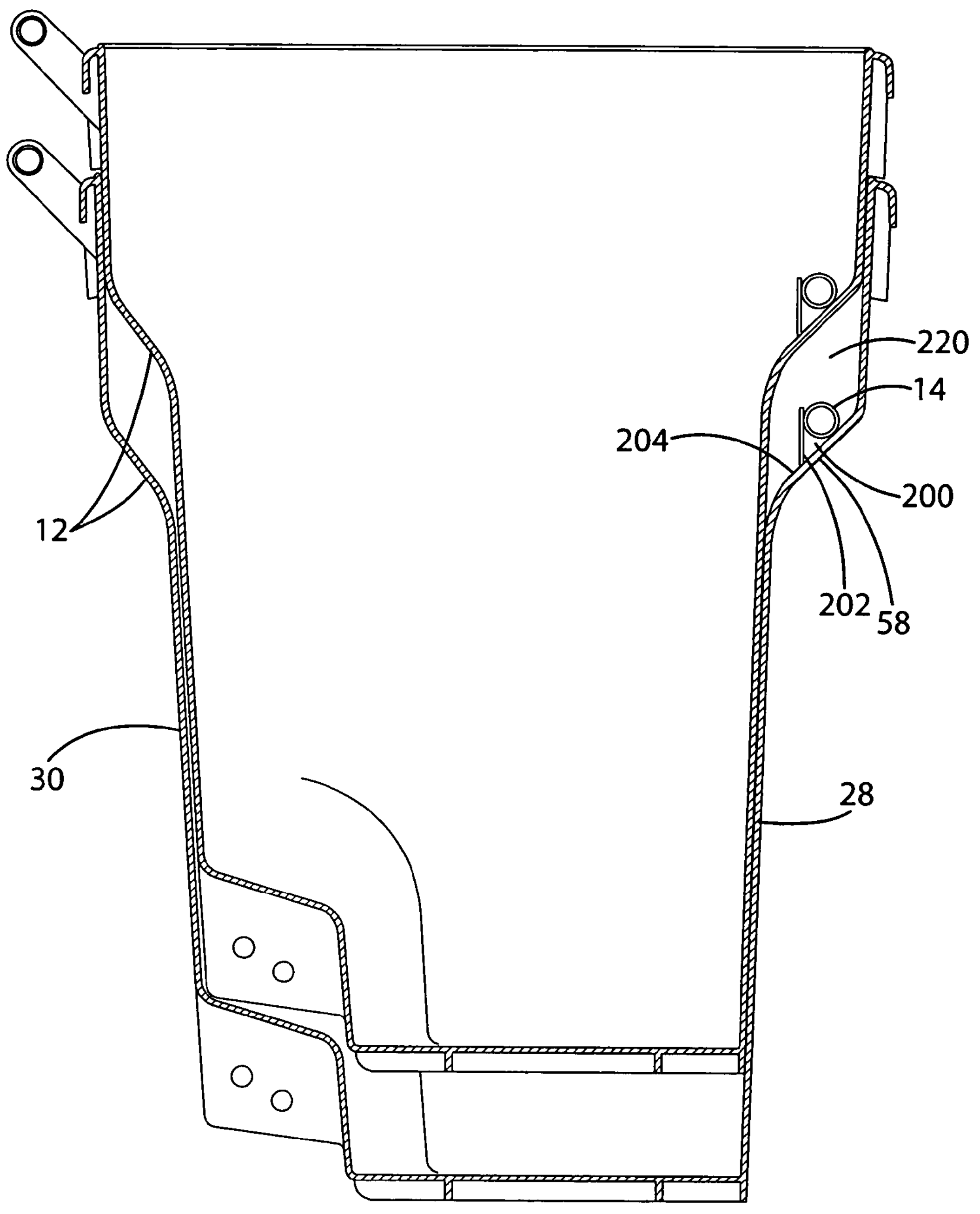
FIG. 12 is a side cross-sectional view of two stacked containers and axles in accordance with the first alternative embodiment.

A first alternative embodiment is shown in FIGS. 9-12. In this embodiment, the second axle support 222 is a pocket 200 attached to one or more of the sidewalls 26. As illustrated, the pocket 200 includes a pair of ribs 202 extending upwardly from an inner surface 204 of the transitional portion 58 of the front sidewall 28. The ribs 202 act to hold the axle 14 in a stowage position wherein the ends 94 and 96 of the axle 14 are trapped between the ribs 202 and the transitional portion 58 of the front sidewall 28. The ribs 202 may also attach to the inner surfaces 208 and 210 of the left 32 and right 34 sidewalls for added strength. Alternatively, the pocket 200 may be a recess disposed in one of the sidewalls 26, such as in the transitional portion 58 of the front sidewall 28. As shown in FIGS. 10 and 12, the pocket 200 may be located in various positions on the transitional portion 58 of the front sidewall 28, and may be located on a different sidewall 26, such as on the transitional portion 58 of the rear sidewall 30. Operation of this embodiment is similar to that of the previously disclosed embodiment, except for the differences in the axle stowage positions. As shown in FIG. 12, when the containers of this embodiment are stacked together, the axles 14 are held in the pocket 200 so that they fit in a gap 220 between sequentially stacked containers 12.

Figure 13:
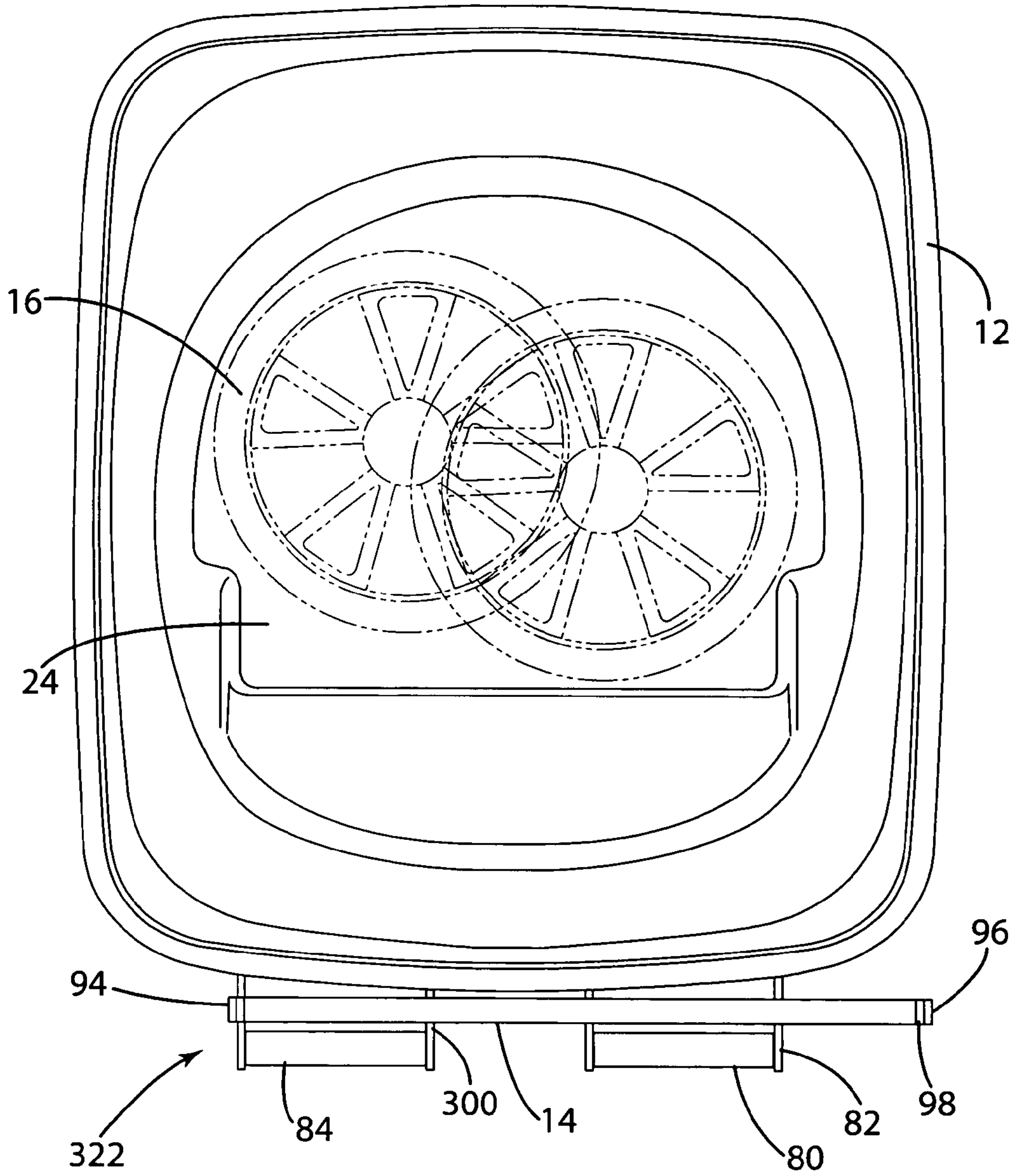
FIG. 13 is a top view of an unassembled refuse cart in accordance with a second alternative embodiment of the present invention.
Figure 14:
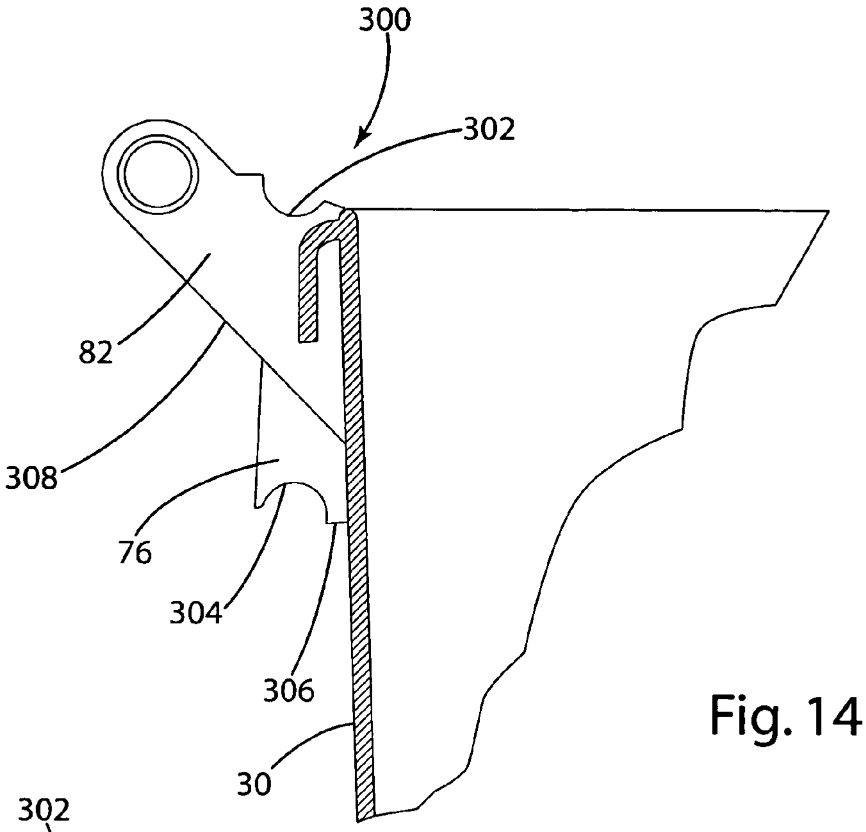
FIG. 14 is a side cross-sectional view of a portion of the container in accordance with the second alternative embodiment.
Figure 15:
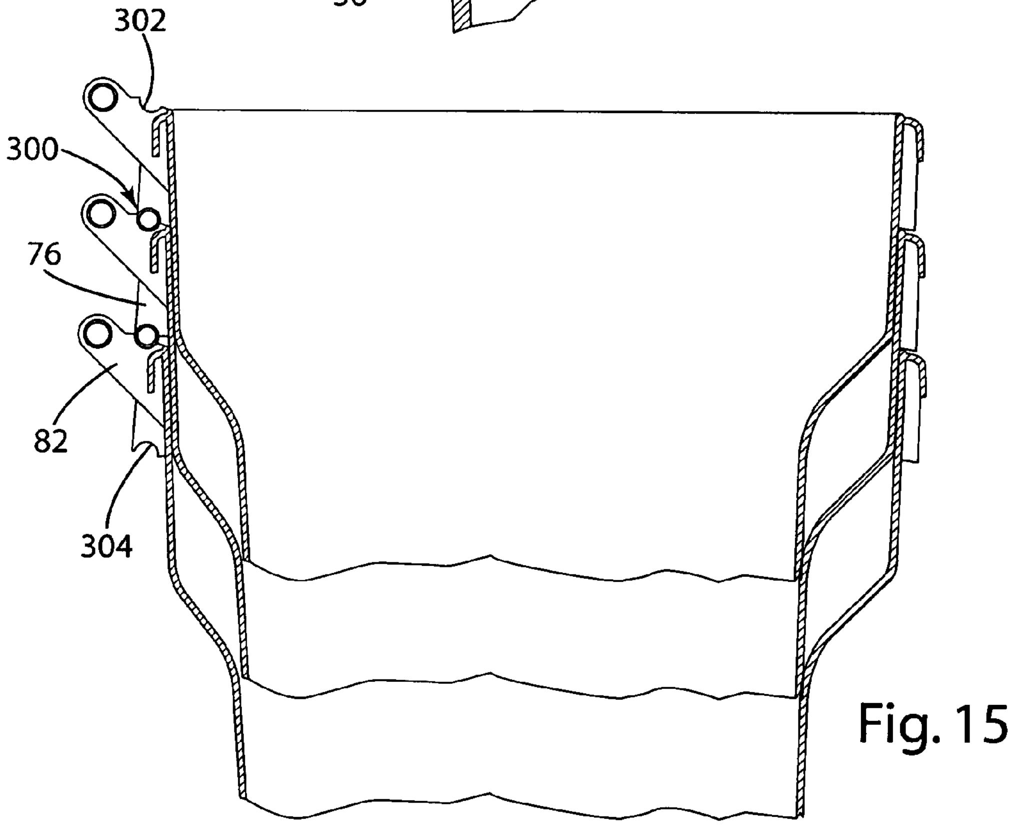
FIG. 15 is a side cross-sectional view of three stacked containers and axles in accordance with the second alternative embodiment.

A second alternative embodiment is shown in FIGS. 13-15. In this embodiment, the second axle support 322 is an axle holder 300 formed in the handles 80. Shown in FIG. 14, the axle holder 300 may be a cradle or a set of cradles 302 defined in each of the handle supports 82. The cradle 302 is shaped to correspond to the circumference of the axle 14, so that an axle 14 can rest on top of each of the handle supports 82 and be held in the cradles 302 of each of the supports 82. In one embodiment, one or more of the cradles 302 may be shaped to correspond to the circumference of one of the grooves 98 on one of the axle ends 94 or 96 so that the cradle 302, or a portion thereof, prevents side-to-side movement of the axle when it is disposed in the axle holder 300. As shown in FIG. 14, the axle holder 300 also includes one or more notches 304 that are defined in a lower surface 306 of the support ribs 76 located on the rear sidewall 30. Similar to the cradles 302 in the handles 80, the shape of the notches 304 in the support ribs 76 may correspond to a portion of the circumference of the axle 14. Referring now to FIG. 15, when the containers 12 are stacked, each axle 14 is held in the axle holder 300 between the cradles 302 in the handle 82 and the notches 304 in the support ribs 76. Alternatively, the notches 304 may be defined in a lower surface 308 of each of the handle supports 82. In operation, this embodiment is similar to that of the previously disclosed embodiments in that the unassembled carts 10 including an axle 14, a container 12, and a pair of wheels 16 are gathered by a manufacturer and the wheels 16 are placed inside the refuse containing space 52. The axle 14 is disposed in an axle stowage position in the axle holder 300. As the containers 12 are stacked together, the wheels 16 of a first container 12 are placed within a refuse defining space 52 of that first container 12 and the axle 14 corresponding to the first container 12 is placed in the cradles 302 on the handle supports 82 of the first container 12. The axle 14 may be disposed in the axle holder 300 so that one of the grooves 98 fits into the particular cradle 302 shaped to fit within the groove 98. The axle 14 is further held in place by the notches 304 in the support ribs 76 of a second container that is stacked within the first container 12. Each sequential container is stacked in a similar way so that each of the axles 14 is trapped between the cradles 302 and the handle supports 82 of a first container and the notches 304 on the support ribs 76 of a second container. In this embodiment, before transporting the stack of unassembled carts 10 to a truck or other vehicle for shipment, the placement of each of the axles 14 into the stowage position can be visually verified.

The above descriptions are those of current embodiments of the invention. Various alterations and changes can be made without departing from the spirit and broader aspects of the invention, which are to be interpreted in accordance with the principles of patent law including the Doctrine of Equivalents.

The invention claimed is:

1. A stackable refuse cart kit comprising:

a single axle;

a pair of wheels, each of said wheels adapted to be attached to said axle; and a container including a first axle support and a second axle support separate from said first axle support, said container defining a refuse containing space, said first axle support adapted to support said axle in an operative position wherein said wheels can be attached to said axle for rolling the cart on said wheels, said second axle support adapted to support said axle in a stowage position, wherein said wheels are unattached from said axle in said stowage position, separate from said operative position, said axle and wheels not interfering with an adjacent container in a stack of the containers when said axle is in said stowage position.

2. The refuse cart of claim 1 wherein said container includes a sidewall and a floor, and said second axle support is a recess in said floor within said refuse containing space, said recess retaining said axle by surrounding a portion of said axle.

3. The refuse cart of claim 2 wherein said axle includes a first end and a second end and said second axle support further includes a pair of ribs extending from said floor, said recess retaining said first end of said axle, said ribs extending on opposite sides of said support to retain said second end of said axle.

4. The refuse cart of claim 2 wherein said floor slopes downwardly towards said recess to funnel said axle into said recess.

5. The refuse cart of claim 2 wherein said axle includes a diameter and said recess includes a depth, said recess depth being approximately the same as said axle diameter.

6. The refuse cart of claim 2 wherein said axle includes a diameter and said recess includes a depth substantially less than said diameter, said floor including an exterior surface defining a recess opposite said recess within said refuse containing space, such that when a plurality of containers are stacked together said axle diameter fits between said recess within said refuse.

7. The refuse cart of claim 1 wherein said container includes a sidewall and a floor, said second axle support including at least one rib extending from an interior surface of said sidewall into said refuse containing space, said rib capable of holding said axle against said sidewall.

8. A stackable refuse cart kit comprising:

an axle;

at least one wheel adapted to be attached to said axle; and a container including a first axle support and a second axle support, said container defining a refuse containing space, said first axle support adapted to support said axle in an operative position wherein said wheel can be attached to said axle for rolling the cart on said wheel, said second axle support adapted to support said axle in a stowage position separate from said operative position, said axle when in the stowage position not interfering with an adjacent container in a stack of the containers, wherein said container includes a sidewall and a floor, wherein said second axle support includes two ribs extending from an interior surface of said sidewall, said axle including first and second ends, wherein each of said ribs is capable of holding one of said axle ends between said rib and said sidewall.

9. The refuse cart of claim 8 wherein said sidewall includes a front sidewall and a rear sidewall, each including an interior and an exterior surface, said first axle support disposed on said exterior surface of said rear sidewall, said ribs disposed on said interior surface of said front sidewall.

10. The refuse cart of claim 9 wherein said front sidewall includes a lower portion, an upper portion, and a joining portion, said lower portion extending upwardly from said floor, said joining portion extending outwardly from said lower portion, said upper portion extending upwardly from said joining portion, said ribs extending from said upper portion proximate said joining portion.

11. The refuse cart of claim 1 wherein said container includes a sidewall and a floor, said sidewall including an exterior surface outside said refuse containing space, second axle support including an axle holder extending from said exterior surface of said sidewall said axle holder defining a space shaped to retain said axle.

12. The refuse cart of claim 11 wherein said container includes a handle extending from said exterior surface of said sidewall, said axle holder including a cradle integrally formed in said handle.

13. The refuse cart of claim 12 wherein said sidewall includes an upper edge and a rim extending around said upper edge, said handle extending from said rim, said handle shaped to hold said axle against said rim.

14. The refuse cart of claim 11 wherein said axle includes a circumference and defines a notch extending around at least a portion of said circumference, a portion of said cradle shaped to extend into said notch when said axle is held in said cradle.

15. The refuse cart of claim 11 wherein said container includes a rib extending from said exterior surface, said rib including a lower edge shaped to correspond to the outer surface of said axle, said lower edge contacting an axle held in the cradle of another container when said container is stacked inside said other container.

16. A stack of unassembled refuse carts comprising:

a single axle having a first end and a second end;

a pair of wheels, each of said wheels adapted to be attached to one of said first and second ends of said axle; and a container defining a space for containing refuse, said container including an axle mount and an axle stowage support separate from said axle mount, said axle mount adapted to receive said axle in a rolling position such that said wheels can be attached to said axle and said container can be rolled on said wheels, said axle stowage support adapted to support said axle in a stowage position unattached from said wheels, said axle and said wheels not interfering with an adjacent container in the stack of carts when said axle is in said stowage position.

17. The stack of unassembled carts of claim 16 wherein said axle stowage support is a cradle that is shaped to correspond to the outer surface of said axle, said cradle retaining said axle by surrounding at least a portion of said axle.

18. The stack of unassembled carts of claim 17 wherein said axle includes a circumference and defines a notch cut into said circumference, a portion of said cradle extending into said notch.

19. The stack of unassembled carts of claim 16 wherein said container includes an interior surface and an exterior surface and a handle on said exterior surface, said axle stowage support being a cradle defined in said handle to hold said axle between said handle and said exterior surface.

20. The stack of unassembled carts of claim 16 wherein said axle stowage support is a cradle that includes an interior surface and an exterior surface, said exterior surface including a rib having a lower surface, said lower surface shaped to correspond to the outer surface of said axle, said lower surface contacting the surface of an axle that is held in the cradle of another container when said container is stacked inside said other container.

21. A stackable refuse cart comprising:

an axle;

a wheel adapted to be attached to said axle; and a container including a plurality of sidewalls and a floor, said sidewalls and said floor defining a space for containing refuse, at least one of said sidewalls including a rib extending therefrom within said space for containing refuse, said rib capable of supporting said axle against said at least one of said sidewalls within said space.

* * * * *